United States Patent [19]

Laas et al.

[11] Patent Number: 5,596,066
[45] Date of Patent: Jan. 21, 1997

[54] DIMERIC DIOL-MODIFIED POWDER COATING CROSS-LINKING AGENTS CONTAINING URETDIONE GROUPS

[75] Inventors: Hans-Josef Laas, Köln; Reinhard Halpaap, Odenthal; Hans-Ulrich Meier-Westhues, Leverkusen; Wolfgang Schultz, Krefeld, all of Germany

[73] Assignee: Bayer Aktiengesellschaft, Leverkusen, Germany

[21] Appl. No.: 582,715

[22] Filed: Jan. 4, 1996

[30]    Foreign Application Priority Data

Jan. 9, 1995 [DE] Germany ............................ 19500403.5

[51] Int. Cl.⁶ ..................................................... C08G 18/10
[52] U.S. Cl. ............................. 528/73; 528/45; 528/74.5; 528/75; 528/60; 528/65; 252/182.2
[58] Field of Search ............................... 528/74.5, 73, 75, 528/45; 252/182.2

[56]    References Cited

U.S. PATENT DOCUMENTS

| | | | |
|---|---|---|---|
| 3,857,818 | 12/1974 | Frizelle | 260/77.5 TB |
| 4,044,171 | 8/1977 | Muller et al. | 427/27 |
| 4,375,539 | 3/1983 | McBride et al. | 528/288 |
| 4,413,079 | 11/1983 | Disteldorf et al. | 524/169 |
| 4,463,154 | 7/1984 | Disteldorf et al. | 528/45 |
| 4,483,798 | 11/1984 | Disteldorf et al. | 260/239 |

*Primary Examiner*—Rachel Johnson
*Attorney, Agent, or Firm*—Joseph C. Gil; Thomas W. Roy

[57] ABSTRACT

Polyisocyanate polyaddition products which are solid below 40° C. and liquid above 125° C., contain uretdione and urethane groups and have a content of at least 1 wt. % of urethane groups obtained from the reaction of dimeric diols with isocyanate groups; a method of producing the these products by the reaction of polyisocyanates containing uretdione groups with dimeric diols; and the use of these polyaddition compounds as the starting component in the manufacture of polyurethane plastics, particularly as the cross-linking component in thermally cross-linkable two-component polyurethane powder coating compositions.

9 Claims, No Drawings

DIMERIC DIOL-MODIFIED POWDER COATING CROSS-LINKING AGENTS CONTAINING URETDIONE GROUPS

BACKGROUND OF THE INVENTION

1. Field of the Invention

The present invention relates to dimeric diol-modified polyaddition compounds containing uretdione groups, a process for their production and their use as cross-linking agents for thermally cross-linkable powder coating compositions.

2. Description of the Prior Art

Combinations of blocked polyisocyanates and organic polyhydroxyl compounds, which are solid at room temperature, are valuable binders for thermally cross-linkable powder coating compositions (see e.g. DE-OS 2,105,777, DE-OS 2, 542 191, DE-OS 3,143,060, DE-OS 2,735,497, DE-OS 2,842,641, EP-A 286,799, EP-A 218,040, EP-A 460,963, DE-OS 2,801,126, EP-A 403,779, WO 91/15532, U.S Pat. No. 3,857,818, U.S. Pat. No. 4,375,539, EP-A 409,745, DE-OS 2,812,252, DE-OS 2,946,085 and DE-OS 3,434,881).

A common disadvantage of the systems in these prior publications is that during thermal cross-linking, the compounds used as blocking agents split off and escape into the environment. Consequently, for environmental and health reasons, special precautions have to be taken when working with these materials in order to purify the waste air and/or recover the blocking agent.

One attempted means of overcoming this disadvantage is to use polyisocyanate cross-linkers that contain uretdione groups, but are free from blocking agents. The products are cross-linked by thermal re-cracking of the uretdione groups.

Manufacture of these powder cross-linking agents is known. For example, DE-OS 2,420,475 describes cross-linking agents for polyurethane (PUR) baking systems. These cross-linking agents are free from blocking agents and are obtained by reacting polyisocyanates or polyisocyanate mixtures containing uretdione groups with aliphatic or cycloaliphatic compounds containing one or two, preferably two isocyanate-reactive groups. In particular, solid cross-linking agents having melting points of 140° to 260° C. are obtained by reacting simple diols, optionally containing ether groups, with polyisocyanates containing uretdione groups and prepared from aromatic diisocyanates, such as toluylene diisocyanate (TDI).

Since splitting of the uretdione group in the presence of hydroxy-functional reactants occurs at temperatures as low as about 110° C., the cross-linking agents cannot be manufactured in the melt and must be prepared in solvents inert towards isocyanates, which necessitates an additional step for removing the auxiliary solvent.

Powder cross-linking agents containing uretdione groups and prepared from straight-chain difunctional IPDI uretdione, simple diols optionally containing ether groups and optionally chain terminating monoamines or monoalcohols are disclosed in EP-A 0,045,994, EP-A 0,045,996 and EP-A 0,045,998. In the manufacture of these polyaddition products, the reaction temperature must not exceed 110° C. in order to prevent splitting of the uretdione groups. More particularly, substances melting at or even above the splitting temperature are produced when there is a high degree of chain extension, which is required for cross-linking agents having a high uretdione functionality and consequently a high cross-linking density, i.e., when at least 70% of the NCO groups in the difunctional IPDI uretdiones are reacted with diols to provide chain extension. Consequently these polyaddition compounds cannot be reliably and reproducibly manufactured except in solution, which results in a subsequent evaporation step.

The IPDI uretdione powder cross-linking agents described in the cited prior publications have melting points of about 80° C., considerably below the splitting temperature, but they have such high melt viscosities at the maximum permitted reaction temperature of 110° C. that the possibilities of producing them in the melt on an industrial scale are limited, because it is not possible to provide adequate agitation.

Also, due to their high melt viscosity, powder lacquers produced form the known cross-linking agents containing uretdione groups have mediocre optical properties, particularly inadequate levelling properties.

An object of the present invention is to provide PUR powder cross-linking agents containing uretdione groups that do not suffer from the previously described disadvantages of prior art polyaddition products.

This object has been achieved with the polyaddition compounds according to the invention described in detail hereinafter. These polyaddition compounds are based on the surprising observation that polyaddition compounds containing uretdione groups and manufactured with the additional use of diol components in the form of dimeric alcohols, have such low melt viscosities, even at temperatures only slightly above their melting point, that they can be produced without difficulty in the melt and can be used to obtain powder coatings having excellent levelling properties and very high gloss. A particularly surprising fact is that PUR powder coating compositions, which contain the polyaddition compounds according to the inventions as cross-linking agents, harden to form completely cross-linked coatings at appreciably lower baking temperatures than the corresponding polyaddition compounds in the prior art, which are manufactured without using dimeric alcohols.

SUMMARY OF THE INVENTION

The present invention relates to polyaddition compounds which are solid below 40° C. and liquid above 125° C. and contain a) 0 to 2 wt. % of free isocyanate groups (calculated as NCO; molecular weight 42), b) 3 to 16 wt. % of uretdione groups (calculated as $C_2N_2O_2$; molecular weight 84) and c) 10 to 22 wt. % of urethane groups (calculated as —NH—CO—O—, molecular weight 59) of which at least 1 wt. % is obtained by reaction of dimeric diols with isocyanate groups.

The present invention also relates to a process for preparing these polyaddition compounds which comprises reacting A) a polyisocyanate containing uretdione groups and having an average isocyanate functionality of at least 2.0 and B) optionally up to 70 wt. %, based on the total weight of components A) and B), of a diisocyanate other than component A)

with

C) a dimeric diol,

D) optionally up to 70 wt. %, based on the total weight of components C) and D), of a diol having a molecular weight of 62 to 300 other than component C) and E) optionally up to 40 wt. %, based on the total weight of components C), D) and E), of a compound having one isocyanate-reactive groups, at an equivalent ratio of isocyanate groups to isocyanate-reactive groups of 1.2:1 to 0.6:1.

Finally, the present invention relates to the use of these polyaddition compounds as a starting component in the manufacture of polyurethane plastics, more particularly as a cross-linking agent in thermally cross-linkable two-component polyurethane powder coating compositions for coating any heat-resistant substrates.

DETAILED DESCRIPTION OF THE INVENTION

Starting compounds A) are selected from polyisocyanates containing uretdione groups and having an average isocyanate functionality of at least 2.0, preferably 2.0 to 2.5, and an NCO content of 10 to 30 wt. %. These polyisocyanates may be obtained in known manner by the catalytic dimerization of a portion of the isocyanate groups of monomeric diisocyanates, preferably followed by separation of the unreacted excess diisocyanate, e.g., by thin-layer distillation, to a residual content of not more than 0.5 wt. %.

Starting compounds A) may be prepared from any diisocyanates containing aliphatically, cycloaliphatically, araliphatically and/or aromatically bound isocyanate groups having a molecular weight of 140 to 400, such as 1,4-diisocyanatobutane, 1,6-diisocyanatohexane, 1,5-diisocyanato-2,2-dimethyl pentane, 2,2,4- or 2,4,4-trimethyl-1,6-diisocyanatohexane, 1,10-diisocyanatodecane, 1,3 and 1,4-diisocyanato-cyclohexane, 1,3-diisocyanato-2(4)-methyl cyclohexane, 1-isocyanato-3,3,5-trimethyl-5-isocyanatomethyl cyclohexane (isophorone diisocyanate), 1-isocyanato-1-methyl-4(3)-isocyanatomethyl cyclohexane, 4,4'-diisocyanatodicylohexyl methane, 1,3- and 1,4-phenylene diisocyanate, 2,4- and/or 2,6-toluylene diisocyanate, diphenyl methane-2,4'- and/or -4,4'-diisocyanate, naphthylene-1,5-diisocyanate and mixtures thereof.

The catalysts for producing starting compounds A) from the previously mentioned diisocyanates by the dimerization of isocyanate groups are known and include the tertiary organic phosphines described in U.S. Pat. No. 4,614,785, column 4, lines 11 to 47, and DE-OSS 1,934,763 and 3,900,053; the tris-(dialkylamino)-phosphines described in DE-OSS 3,030,513, 3,227,779 and 3,37,635; the substituted pyridines described in DE-OSS 1,081,895 and 3,739,549; and the substituted imidazoles or benzimidazoles described in EP 417,603.

Preferred starting compounds A) are polyisocyanates containing uretdione groups and prepared from diisocyanates having aliphatically and/or cycloaliphatically bound isocyanate groups.

It is particularly preferred to use polyisocyanates containing uretdione groups based on 1,6-diisocyanatohexane (HDI), which have NCO content of 19.5 to 25.0 wt. % and a uretdione group content ($C_2N_2O_2$) of 15.0 to 25 Wt.%, or based on 1-isocyanato-3,3,5-trimethyl-5-isocyanatomethyl cyclohexane (IPDI), which have an NCO content of 15.0 to 18.9 wt. % and a uretdione group content of 12.0 to 18.9 wt. %. Also preferred are mixtures of polyisocyanates containing uretdione groups, in particular polyisocyanates which have an NCO content of 16.0 to 24.0 wt. % and a uretdione group content of 13.0 to 24.0 wt. % and are obtained by the dimerization of mixtures of HDI and IPDI.

In the known processes for preparing polyisocyanates containing uretdione groups by catalytic dimerization, the dimerization reaction is often accompanied by a trimerization reaction, resulting in higher than difunctional polyisocyanates containing isocyanurate groups. Therefore, the average NCO functionality of component A), based on free NCO groups, is preferably 2.0 to 2.5.

Other diisocyanates B) can optionally be used in admixture with component A). Examples include the diisocyanates previously mentioned for the preparation of starting compounds A), which contain aliphatically, cycloaliphatically, araliphatically and/or aromatically bound isocyanate groups. Diisocyanates B) are used, if at all, in an amount of up to 70 wt. %, preferably up to 50 wt. %, based on the total weight of components A) and B).

Mixtures of starting components A) and B) can be solutions of polyisocyanates containing uretdione groups in monomeric diisocyanates, which may be obtained during manufacture of the starting component A) if the excess unreacted diisocyanates are not separated after the catalytic dimerization. The proportion of diisocyanate B) in the total amount of the starting components A) and B) can be up to 70 wt. %. Diisocyanates B) are preferably selected from diisocyanates having cycloaliphatically bound isocyanate groups. It is particularly preferred to use 1-isocyanato-3,3,5-trimethyl-5-isocyanatomethyl cyclohexane and/or 4,4'-diisocyanato-dicyclohexyl methane as diisocyanate B).

Starting compounds C) are selected from dimeric diols, which can be produced in known manner, e.g., by the hydrogenation of dimeric fatty acids and/or their corresponding esters according to DE-AS 1,768,313. Dimerization products of oleic acid, linoleic acid, linolenic acid, palmitoleic acid, elaidic acid, erucic acid and/or esters thereof are suitable educts for this purpose. More preferably, the educts are dimerization products of mono- or polyunsaturated fatty acid mixtures, e.g., obtained during cracking of natural fats and/or oils, e.g. olive oil, sunflower oil, soya oil, cottonseed oil and/or tall oil.

Depending upon the conditions chosen for the dimerization reaction, the dimeric fatty acids can be accompanied by varying quantities of oligomeric fatty acids and/or traces of monomeric fatty acids or esters thereof. If the dimerized fatty acids or fatty-acid esters contain relatively large quantities of monomeric fatty acids or fatty-acid esters, it may be advantageous, before or after hydrogenation to the dimeric diols, to separate the monomeric substances by distillation, preferably in the form of fatty-acid esters of lower alcohols containing 1 to 4 carbon atoms.

The dimerized fatty acids or esters thereof can be hydrogenated according to DE-AS 1,768,3 13 in the presence of copper-containing and/or zinc-containing catalysts in conventional continuously-operating pressure hydrogenation apparatus with a, gas circuit. Under these conditions the carboxyl groups in the fatty acids are hydrogenated to hydroxyl groups and optionally also the double bonds in the dimerized fatty acids or esters thereof are partly or completely hydrogenated. Alternatively hydrogenation can be brought about so that the double bonds are completely retained during hydrogenation. In that case unsaturated dimeric diols are produced, optionally mixed with trimeric triols and residual monomers. However, hydrogenation is preferably carried out so that the double bonds are at least partly or completely hydrogenated.

Another method for preparing completely saturated dimeric diols is to convert saturated dimeric fatty acids into the corresponding saturated dimeric diols by hydrogenation.

Manufacture of the dimeric diols by dimerization of unsaturated alcohols in the presence of silica/alumina catalysts is disclosed in WO 91/13918. The unsaturated alcohols used are mono- and/or poly-unsaturated fatty alcohols such as palmitoleyl, oleyl, elaidyl, linolyl, linolenyl and erucyl alcohol. The double bonds in the unsaturated dimeric diols produced by this process can optionally be partly or completely hydrogenated.

Starting compounds C) for the method according to the invention are preferably dimeric diols having 36 carbon atoms, which may be obtained, e.g., by one of the previously-described methods from fatty acids or esters thereof or fatty alcohols containing 18 carbon atoms.

As previously mentioned, the dimeric diols produced by the aforementioned processes also contain varying quantities of trimeric triols and residual monomers; the proportion of true dimeric diols is usually above 70 wt. %. In accordance with the present invention, the term "dimeric diol" not only covers true dimeric diols but also industrial mixtures thereof with the corresponding monomeric alcohols and the corresponding higher homologues, in particular the corresponding triols. Dimeric diols C) preferably have an average molecular weight, calculated from the hydroxyl-group content and the hydroxyl functionality, of 500 to 670 and an average hydroxyl functionality of 1.9 to 2.2.

The most preferred dimeric diols are those manufactured by the previously described processes which contain 90 to 99 wt. % of dimeric diols. Among these, particular preference is given to those dimeric diols in which the double bonds are at least partly or completely hydrogenated.

Starting compounds C) are used preferably in an amount of 20 to 45, more preferably 25 to 40 wt. %, based on the total weight of components A) to E).

Diols D) may optionally be used in the method according to the invention. Examples include divalent alcohols having a molecular weight range of 62 to 300, such as 1,2-ethanediol, 1,2 and 1,3-propanediol, the isomeric butanediols, pentanediols, hexanediols, heptanediols and octanediols, 1,2 and 1,4-cyclohexanediol, 1,4-cyclohexane dimethanol and 4,4'-(1-methyl ethylidene)bicyclohexanol.

Diols D) are optionally used in an amount of up to 70 wt. %, preferably up to 50 wt. %, based on the total weight of components C) and D).

Compounds E), which have monofunctional reactivity with isocyanate groups, may also be optionally used in the method according to the invention. Examples include aliphatic or cycloaliphatic primary monoamines such as methyl amine, ethyl amine, n-propyl amine, isopropyl amine, the isomeric butyl amines, pentyl amines, hexyl amines and octyl amines, n-dodecyl amine, n-tetradecyl amine, nhexadecyl amine, n-octadecyl amine, cyclohexyl amine, the isomeric methyl cyclohexyl amines and aminomethyl cyclohexane; secondary monoamines such as dimethyl amine, diethyl amine, dipropyl amine, diisopropyl amine, dibutyl amine, diisobutyl amine, bis-(2-ethylhexyl)-amine, N-methyl and N-ethyl cyclohexyl amine and dicyclohexyl amine; and monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methyl cyclohexanols and hydroxymethyl cyclohexane.

Monofunctional compounds E) are optionally used in amounts of up to 40 wt. %, preferably 25 wt. %, based on the total weight of isocyanate-reactive components C), D) and E). Preferably, compounds are aliphatic or cycloaliphatic monoalcohols.

In the reaction according to the invention, polyisocyanates A) containing uretdione groups and optionally diisocyanates B) are reacted with the dimeric diols C) and optionally diols D) and monofunctional compounds E) in amounts sufficient to provide an equivalent ratio of isocyanate groups to isocyanate-reactive groups of 1.2:1 to 0.6:1, preferably 1.1:1 to 0.8:1, at a temperature of 40° to 110° C., preferably 60° to 105° C.

When using equivalent or excess quantities of isocyanate groups, the reaction is continued until the residual NCO content is not more than 2.0 wt. %, preferably below 1.2 wt. % and more preferably below 0.9 wt. %. When using less than stoichiometric quantities of isocyanate groups, the reaction is continued until the residual NCO content is below 0.5%, preferably below 0.2% and more preferably until all of isocyanate groups have completely reacted. The nature and proportions of the starting compounds are chosen such that the resulting polyaddition compounds contain the required amounts of groups a) to c). The content of free isocyanate groups a) in the polyaddition compounds is preferably below 1.2 wt. %, more preferably below 0.9 wt. %; the content of uretdione groups b) is preferably 5 to 15 wt. %, more preferably 7 to 14 wt. %; the content of urethane groups c) is preferably 11 to 20 wt. %, more preferably 12 to 17 wt. %; preferably at least 2 wt. %, more preferably 2 to 11 wt. %, which are obtained by reaction of dimeric diols with isocyanate groups. The polyaddition compounds are solid below 40° C. and liquid above 125° C., and preferably have a melting point or melting range, measured by differential thermal analysis (DTA), of 40° to 110° C., more preferably 50° to 100° C.

Even at temperatures slightly above their melting point or melting range, the polyaddition products containing uretdione groups according to the invention have a very low melt viscosity. Therefore, they can be manufactured very easily in the melt by the method according to the invention at temperatures below the splitting temperature of uretdione groups.

While not necessary, the reaction can optionally be carried out in a suitable solvent inert towards isocyanate groups. Examples of suitable solvents for this less preferred embodiment include known lacquer solvents such as ethyl acetate, butyl acetate, ethylene glycol monomethyl or monoethyl ether acetate, 1-methoxypropyl-2-acetate, 2-butanone, 4-methyl-2-pentanone, cyclohexanone, toluene, propylene glycol diacetate, diethylene glycol dimethyl ether, diethylene glycol ethyl or butyl ether acetate, n-methyl pyrrolidone, n-methyl caprolactam and mixtures thereof.

At the end of the reaction, these optional solvents must be separated from the product obtained, e.g. by simple suction, spray-drying or extrusion of the melt into an evaporation screw.

The reaction can be accelerated by using conventional catalysts known from polyurethane chemistry, e.g., tert. amines such as triethyl amine, pyridine, methyl pyridine, benzyl dimethyl amine, N,N-endoethylene piperazine, N-methyl piperidine, pentamethyl diethylene triamine, N,N-dimethylamino cyclohexane and N,N'-dimethyl piperazine; and metal salts such as iron (III) chloride, zinc chloride, zinc-2-ethyl caproate, tin (II)-ethyl caproate, dibutyl tin (IV) dilaurate and molybdenum glycolate.

These catalysts are optionally used in amounts of 0.001 to 2.0 wt. %, preferably 0.01 to 0.2 wt. %, based on the total amount of starting compounds.

The polyaddition compounds according to the invention are valuable starting materials for the manufacture of polyurethane plastics by the isocyanate polyaddition process. They are preferably used as cross-linking components for thermosettable PUR powder coating compositions that do not contain blocking agents.

Suitable reactants for the polyaddition compounds according to the invention include the known binders from powder lacquer technology that contain groups capable of reacting with isocyanate groups, e.g., hydroxyl, carboxyl, amino, thiol, urethane or urea groups. It is preferred to use hydroxy-functional powder lacquer binders which are solid below 40° C. and liquid above 130° C. The softening temperature of these hydroxy-functional resins, which may be determined by differential thermal analysis (DTA), is preferably 30° to 120° C., more preferably 35° to 110° C.

The hydroxyl numbers for these co-reactants are from 25 to 200, preferably 30 to 130, and their number average molecular weight ($M_n$, calculated from the functionality and the hydroxyl content) is generally 400 to 10,000, preferably 1000 to 5000.

Suitable powder lacquer binders include polyesters, polyacrylates and polyurethanes containing hydroxyl groups, as described in the previously mentioned prior art publications, and in EP-A 0,045,998 and EP-A-0,254,152. Mixtures of these co-reactants can also be used.

In order to manufacture the ready-for-use powder coating compositions, the polyaddition compounds according to the invention are mixed with suitable hydroxy-functional powder lacquer binders as co-reactants and optionally other known additives, such as catalysts, pigments, fillers or levelling agents. The components are combined to form a homogeneous material, e.g., in extruders or kneaders at temperatures above the melting range of the individual components, e.g. at 70° to 130° C., preferably 70° to 110° C.

The solid obtained after cooling the melt is then ground and freed from granular components above the desired grain size, e.g. above 0.1 mm, by screening.

The polyaddition compounds according to the invention and the hydroxyfunctional binders are present in amounts sufficient to provide an equivalent ratio of isocyanate groups to isocyanate-reactive groups of 0.6:1 to 1.4:1, preferably 0.8:1 to 1.2:1. In this ratio "isocyanate groups" refers to the sum of free isocyanate groups and isocyanate groups in the form of dimeric uretdione groups. Catalysts may optionally be used to activate the hardening or curing process. Examples include those previously for accelerating the reaction to form the polyaddition compounds according to the invention. These catalysts are optionally used in amounts of 0.01 to 5.0 wt. %, preferably 0.05 to 1.0 wt. %, based on the total amount of organic binders, i.e., the polyaddition compounds according to the invention and the hydroxyfunctional powder lacquer binders, but excluding the optional additives.

The resulting sprayable powder coating composition can be applied by conventional methods, such as electrostatic powder spraying or whirl sintering, to the substrates for coating. The coatings are cured or hardened by heating to a temperature of 110° to 220° C., preferably 130° to 200° C., for a period of about 10 to 30 minutes. The resulting coatings are hard and resilient, and characterized by good resistance to solvents and chemicals.

Due to the low melt viscosity of the polyaddition compounds containing uretdione groups according to the invention, the powder coatings manufactured therefrom have excellent levelling properties and very high gloss. Completely cross-linked coatings can be obtained at much lower baking temperatures than when using corresponding prior art polyaddition compounds manufactured without use of dimeric diols.

Any heat-resistant substrates such as glass or metals can be coated according to the invention.

The following examples further illustrate the invention. All pans and percentages, except for gloss values, are by weight unless otherwise indicated.

EXAMPLES

EXAMPLE 1

1000 g (4.3 equiv) of a polyisocyanate containing uretdione groups and based on 1-isocyanato-3,3,5-trimethyl-5-isocyanatomethyl cyclohexane (IPDI) and having a content of 17.9% free isocyanate groups, an average NCO functionality of 2.0 and a content of 19.1% uretdione groups (determined by titration when hot) was heated to 80° C. in an atmosphere of dry nitrogen.

Next, a mixture of 464 g (1.7 equiv) of a dimeric diol having a dimeric diol content of over 90 wt. %, a viscosity at 23° C. of 2500 mPa. s, an average hydroxyl functionality of 2 and an OH number of 205 mg KOH/g, 76.5 g (1.7 equiv) of 1,4-butanediol and 117 g (0.9 equiv) of 2-ethyl-1-hexanol was added within 30 minutes and agitated at a reaction temperature of not more 100° C. until the NCO content of the reaction mixture, after 7 to 8 hours, had fallen to 0.9%.

The melt was cooled by pouring onto a metal sheet to obtain a polyaddition compound according to the invention in the form of a practically colorless solid resin having the following characteristics:

| | |
|---|---|
| NCO content | 0.9% |
| Uretdione group content (calculated) | 11.5% |
| Total NCO content | 12.4% |
| Melting point | 71–73° C. |
| Total urethane group content (calculated) | 14.0% |
| Urethane group content from dimeric diol (calculated) | at least 4.8% |

EXAMPLE 2 (COMPARISON)

1000 g (4.3 equiv) of the polyisocyanate containing uretdione groups from Example 1 was heated to 80° C. in dry nitrogen. Next, a mixture of 153 g (3.4 equiv) of 1,4-butanediol and 117 g (0.9 equiv) of 2-ethyl-1-hexanol was added within 30 minutes. Due to the rapidly increasing viscosity of the reaction mixture, the heating-bath temperature had to be raised to 110° C. so that the mixture could be agitated. After about 40 minutes the NCO content of the reaction mixture was 2.8%. After 60 minutes the temperature of the reaction mixture, in spite of a uniform ambient temperature, had risen from 110° C. to 127° C. due to the further increase in viscosity and the effect of the shearing forces during agitation. The NCO content rose to 4.1% and did not decrease even after a prolonged reaction.

Comparison Example 2 demonstrates that considerable splitting of uretdione groups to form isocyanate groups occurs when the polyisocyanate containing uretdione groups is reacted with simple diols in the melt according to the method described in Example 1.

EXAMPLE 3 (COMPARISON)

1000 g (4.3 equiv) of the polyisocyanate containing uretdione groups of Example 1 was placed in 1270 g of anhydrous toluene at 80° C. under dry nitrogen. A mixture of 153 g (3.4 equiv) of 1,4-butanediol and 117 g (0.9 equiv)

of 2-ethyl-1-hexanol was added within 30 minutes and agitated at a reaction temperature of 100° C. until the NCO content had fallen to a value of 0.2%. The resulting yellowish solution was then completely freed from solvent by spray drying in a Minispray Dryer 190 commercial laboratory spray dryer (Messrs Bchi). The result was a pale yellow product having the following characteristics:

| NCO content | 0.3% |
|---|---|
| Uretdione group content (calculated) | 15.0% |
| Total NCO content | 15.3% |
| Melting point | 105–111° C. |

EXAMPLE 4

1000 g (4.3 equiv) of the polyisocyanate containing uretdione groups of Example 1 was heated to 80° C. in a dry nitrogen atmosphere. Next, a mixture of 697 g (3.4 equiv) of the dimeric diol of Example 1 and 117 g (0.9 equiv) of 2-ethyl-1-hexanol was added within 30 minutes and agitated at a reaction temperature of up to 105° C. until the NCO content of the reaction mixture, after about 3 hours, had fallen to a value of 0.7%.

The melt was cooled by pouring onto a metal sheet, which resulted in a polyaddition compound according to the invention in the form of a practically colorless solid resin having the following characteristics:

| NCO content | 0.7% |
|---|---|
| Uretdione group content (calculated) | 10.5% |
| Total NCO content | 11.2% |
| Melting point | 65–67° C. |
| Total urethane group content (calculated) | 13.0% |
| Urethane group content from dimeric diol (calculated) | at least 10.1% |

EXAMPLE 5

1000 g (5.1 equiv) of a polyisocyanate containing uretdione and isocyanurate groups, which is based on 1,6-diisocyanatohexane (HDI) has a content of 21.6% free isocyanate groups, an average NCO functionality of 2.3 and a content (determined by titration when hot) of 15.0% uretdione groups was heated together with 66 g (0.5 equiv) of 4,4'-diisocyanatodicyclohexyl methane to 80° C. in a dry nitrogen atmosphere. Next, a mixture of 113 g (1.5 equiv) of n-butanol, 683 g (2.5 equiv) of the dimeric diol from Example 1 and 94 g (1.6 equiv) of 1,6-hexanediol was added within 30 minutes and agitated at a reaction temperature of up to 108° C. until the NCO content of the reaction mixture, after about 3 hours, had fallen to a value of 0.8%.

The melt was cooled by pouring onto a metal sheet, which resulted in a polyaddition compound in the form of a colorless solid resin having the following characteristics:

| NCO content | 0.8% |
|---|---|
| Uretdione group content (calculated) | 7.7% |
| Total NCO content | 8.5% |
| Melting-point | 70–73° C. |
| Total Urethane group content (calculated) | 15.8% |
| Urethane group content from dimeric diol (calculated) | at least 6.4% |

EXAMPLE 6 (USE)

75.6 parts by weight of a polyester containing hydroxyl groups and prepared from 66.6 parts by weight of terephthalic acid, 38.2 parts by weight of neopentyl glycol, 5.3 parts by weight of 1,6-hexanediol and 4.5 parts by weight of 1,1,1-trimethylol propane and having an OH number of 50 and a melting range (determined by differential thermal analysis) of 55° to 60° C., was thoroughly mixed with 22.9 parts by weight of the polyaddition compound obtained in Example 1 (NCO:OH equivalent ratio 1:1), 1.0 part by weight of a commercial levelling agent (Perenol F 30 P, Messrs Henkel, Düsseldorf) and 0.5 parts by weight of tin(II) octoate catalyst. The mixture was then homogenized with a Buss Cokneter type PLK 46 at 150 rpm and a casing temperature of 40° C. in the feed region and on the shaft and 80° C. in the process part, reaching mass temperatures of 95° to 100° C. The solidified melt was ground in an ACM 2 separating mill (Messrs Hosokawa Mikropul) and screened with a 90 μm screen. The resulting powder was sprayed onto a degreased steel sheet at a high voltage of 70 kV, using an ESB cup gun, and hardened after 30 minutes, at 160° C. and 170° C., respectively, into a smooth, transparent coating.

In a comparative test, a clear powder coating composition was prepared in similar manner from 79.1 parts by weight of the same polyester containing hydroxyl groups and 19.4 parts by weight of the polyaddition compound obtained in Comparison Example 3, 1.0 part by weight of a commercial levelling agent (Perenol F 30 P; Messrs Henkel, Düsseldorf) and 0.5 parts by weight of tin(II) octoate catalyst, sprayed onto a degreased steel sheet and hardened as before for 30 minutes at 160° and 170° C., respectively. The NCO:OH equivalent ratio 1:1.

The following lacquer properties were found at film thicknesses of about 60 μm:

Powder coating prepared from polyaddition compound of:

|  |  | Example 1 | | Comparative Example 3 | |
|---|---|---|---|---|---|
|  |  | 30' 160° C. | 30' 170° C. | 30' 160° C. | 30' 170° C. |
| ET[a] |  | >9 | >9 | 0.6 | >9 |
| Gloss[b] | 20° | 86 | 89 | 60 | 64 |
|  | 60° | 103 | 105 | 100 | 100 |
| Ac[c] | DR | 50 | 50 | 50 | 50 |
|  | assessment | 2 | 2 | 2 m | 2 m |

[a] ET = Erichsen cupping to DIN 53156
[b] Gloss = Gardner gloss at 20° and 60° reflection angle, respectively
[c] Ac = acetone test; DH = number of double rubs with impregnated cotton plug
Assessment:
0 = film intact
1 = surface of film softened
2 = film swollen down to substrate
m = dull (loss of gloss)

The comparison demonstrates that even at a lower baking temperature the polyaddition compound according to the invention can be used to obtain a completely cross-linked, resilient coating, which also has better levelling properties and higher gloss.

EXAMPLE 7 (USE)

47.2 parts by weight of the polyester containing hydroxyl groups described in Example 6 was converted into a white pigmented coating composition by the method described in Example 6, using 15.8 parts by weight of the polyaddition compound according to the invention in Example 4, 1.0 part by weight of a commercial levelling agent (Modaflow P III), 1 part by weight of tin (II) octoate catalyst and 35.0 parts by weight of a white pigment (Bayertitan R-KB 4). The powder was sprayed on to a degreased steel sheet at a high voltage of 70 kV, using an ESB cup gun, and was hardened at 180° C. for 20 minutes.

The following film properties were observed from a coating having a film thickness of about 70 μm:

| ET[a] | | >9 |
|---|---|---|
| Gloss[b] | 20° | 65 |
| | 60° | 86 |
| Ac[c] | DR | 50 |
| | Assessment | 2 |

[a] ET = Erichsen cupping to DIN 53156
[b] Gloss = Gardner gloss at 20° and 60° reflection angle, respectively
[c] Ac = acetone test; DR = number of double rubs with impregnated cotton plug
Assessment:
0 = film intact
1 = surface of film softened
2 = film swollen down to substrate
m = dull (loss of gloss)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyaddition compound which is solid below 40° C. and liquid above 125° C. and contains
   a) 0 to 2 wt. % of free isocyanate groups (calculated as NCO; molecular weight 42),
   b) 3 to 16 wt. % of uretdione groups (calculated as $C_2N_2O_2$; molecular weight 84) and
   c) 10 to 22 wt. % of urethane groups (calculated as —NH—CO—O—, molecular weight 59) of which at least 1 wt. % is obtained by reaction of dimeric diols with isocyanate groups.

2. A method of producing a polyaddition compound which is solid below 40° C. and liquid above 125° C. and contains
   a) 0 to 2 wt. % of free isocyanate groups (calculated as NCO; molecular weight 42),
   b) 3 to 16 wt. % of uretdione groups (calculated as $C_2N_2O_2$; molecular weight 84) and
   c) 10 to 22 wt. % of urethane groups (calculated as —NH—CO—O—, molecular weight 59) of which at least 1 wt. % of is obtained by reaction of dimeric diols with isocyanate groups,
   which comprises reacting
   A) a polyisocyanate containing uretdione groups and having an average isocyanate functionality of at least 2.0 and
   B) optionally up to 70 wt. %, based on the total weight of components A) and B), of a diisocyanate other than component A)
   with
   C) a dimeric diol,
   D) optionally up to 70 wt. %, based on the total weight of components C) and D), of a diol having a molecular weight of 62 to 300 other than component C) and
   E) optionally up to 40 wt. %, based on the total weight of components C), D) and E), of a compound having one isocyanate-reactive groups,
   at an equivalent ratio of isocyanate groups to isocyanate-reactive groups of 1.2:1 to 0.6:1.

3. The method of claim 2 wherein polyisocyanate A) is based on one or more diisocyanates having aliphatically and/or cycloaliphatically bound isocyanate groups.

4. The method of claim 2 wherein polyisocyanate A) are based on 1,6-diisocyanatohexane and/or 1-isocyanato-3,3,5-trimethyl-5-isocyanatomethyl cyclohexane.

5. The method of claim 2 wherein dimeric diol C) has an average molecular weight of 500 to 670 and an average hydroxyl functionality of 1.9 to 2.2 and is obtained by the dimerization of monohydric, olefinically unsaturated aliphatic alcohols or by the hydrogenation of the dimerization products of olefinically unsaturated aliphatic monocarboxylic acids.

6. The method of claim 3 wherein dimeric diol C) has an average molecular weight of 500 to 670 and an average hydroxyl functionality of 1.9 to 2.2 and is obtained by the dimerization of monohydric, olefinically unsaturated aliphatic alcohols or by the hydrogenation of the dimerization products of olefinically unsaturated aliphatic monocarboxylic acids.

7. The method of claim 4 wherein dimeric diol C) has an average molecular weight of 500 to 670 and an average hydroxyl functionality of 1.9 to 2.2 and is obtained by the dimerization of monohydric, olefinically unsaturated aliphatic alcohols or by the hydrogenation of the dimerization products of olefinically unsaturated aliphatic monocarboxylic acids.

8. A coating composition for the preparation of polyurethane coatings containing the polyaddition compound of claim 1 and a hydroxy-functional co-reactant.

9. A powder coating composition containing as binder a hydroxy-functional co-reactant and the polyaddition compound of claim 1 as the cross-linking agent.

* * * * *